United States Patent [19]

Griffith

[11] 4,360,625
[45] * Nov. 23, 1982

[54] ACICULAR, CRYSTALLINE CALCIUM METAPHOSPHATE

[75] Inventor: Edward J. Griffith, Manchester, Mo.

[73] Assignee: Monsanto Company, St. Louis, Mo.

[ * ] Notice: The portion of the term of this patent subsequent to Aug. 24, 1999, has been disclaimed.

[21] Appl. No.: 153,667

[22] Filed: May 27, 1980

Related U.S. Application Data

[63] Continuation-in-part of Ser. No. 103,787, Dec. 14, 1979, abandoned.

[51] Int. Cl.$^3$ .............................................. C01B 25/30
[52] U.S. Cl. .................................. 524/414; 423/306; 423/314
[58] Field of Search ................. 423/306, 314; 524/414

[56] References Cited

U.S. PATENT DOCUMENTS

| | | | |
|---|---|---|---|
| 2,233,401 | 3/1941 | Copson | 423/314 |
| 2,280,848 | 4/1942 | Pole | 423/306 |
| 3,031,263 | 4/1962 | Sefton et al. | 423/314 |
| 3,378,340 | 4/1968 | Martin et al. | 423/314 |
| 4,239,523 | 12/1980 | Spada | 423/314 |

FOREIGN PATENT DOCUMENTS

| | | | |
|---|---|---|---|
| 522352 | 3/1956 | Canada | 423/314 |
| 971729 | 7/1975 | Canada | 423/314 |

OTHER PUBLICATIONS

Kirk–Othmer, *Encyclopedia of Chemical Technology*, Second Edition, (1968), pp. 248–250.

*Primary Examiner*—O. R. Vertiz
*Assistant Examiner*—Wayne A. Langel
*Attorney, Agent, or Firm*—R. C. Griesbauer; W. H. Duffey

[57] ABSTRACT

Acicular, crystalline calcium metaphosphate having a length to average diameter ratio of at least 10:1 can be prepared by forming a melt of materials used as a source of calcium, phosphorus and alkali metal, cooling the melt to about 550° C. to about 970° C., inducing acicular crystal formation, and recovering the acicular crystals. The diameters of the resultant acicular, crystalline calcium metaphosphates can average as small as 0.5 micron or smaller. Acicular, crystalline calcium metaphosphate can also be prepared with an average diameter of several microns and a length of several centimeters. Such acicular, crystalline calcium metaphosphates are useful in a number of applications, and particularly to prepare composites with organic polymeric materials.

26 Claims, 3 Drawing Figures

ACICULAR, CRYSTALLINE CALCIUM METAPHOSPHATE

CROSS REFERENCE TO RELATED APPLICATIONS

This application is a continuation-in-part of application Ser. No. 103,787 filed Dec. 14, 1979 now abandoned.

BACKGROUND OF THE INVENTION

This invention relates to a new crystalline form of calcium metaphosphate and a method for its preparation. More particularly, this invention relates to acicular, crystalline calcium metaphosphate which is resistant to attack by water, dilute acids and dilute alkali, and to a process for preparing the acicular, crystalline calcium metaphosphate.

Each year billions of kilograms of asbestos, fiberglass and other inorganic fibers are used in a wide variety of applications, such as for insulation, in filtration systems, and in composites with organic polymeric materials like plastics, resins, natural and synthetic elastomers, and the like. Such composites are used to make floor tiles, gaskets, brake linings, clutch facings, and numerous other objects commonly used in industry and in the home.

Although satisfactory performance is achieved by the use of such fibrous materials in these applications, they also have certain disadvantages. For example, many of these fibrous materials, especially asbestos, are suspected of causing a rear cancer, mesothelioma, as well as other diseases such as asbestosis, bronchogenic cancer and gastrointestinal cancer (see "Asbestos-Related Disease", L. Preges et al, Grune & Stratton, New York, 1978, and "Asbestos, Properties, Applications and Hazards", Ed. L. Michaels et al, John Wiley and Sons, New York, 1979). In addition many inorganic fibers, such as the alkali metal titanates, not only are suspected of causing such health problems among users of the fibers, but also it is difficult to grow such fibers longer than a few millimeters. On the other hand, some inorganic fibers are soluble in water, dilute acid or dilute alkali, which limits the usefulness of these fibers.

Condensed phosphates are the only known variety of inorganic substances which are capable of forming fibers and at the same time are normally found in living systems. J. R. VanWazer reports in "Phosphorus And Its Compounds", Volume 1, Interscience Publishers, Inc., New York (1959) at pages 456 and 800, that long chain phosphates have been identified in yeasts, molds, algae and bacteria. An enzymatic synthesis of long chain phosphate salts has been described and is believed to occur by donation of the terminal $PO_4$ group of adenosine triphosphate. Although there is still much to be learned about the various phosphatases which catalyze the scission of P—O—P linkages, it is known that enzymatic hydrolysis of chain and ring phosphates can be extremely rapid in the presence of dipositive cations, such as calcium and especially magnesium. Hence, a fiber or acicular crystal which can degrade to a nutrient in the body while remaining stable in the absence of enzymes should create no health problems, and should be suitable for many applications where fibrous materials are needed.

Those skilled in the art are aware that fibers can be prepared by drawing a fiber from a glassy phosphate, or that certain phosphates, such as crystalline potassium metaphosphate, sometimes called potassium Kurrol's salt, form acicular crystals. However, the usefulness of such amorphous or crystalline fibers is limited because of their solubility in aqueous systems, and/or low tensile strength.

Thus, it can be seen that there is a need for an inorganic fibrous material that can be prepared in a wide range of diameters and lengths, which can withstand temperatures up to about 800° C. for use as insulation and in brake linings and the like, which is virtually insoluble in water, dilute acid or dilute alkali, and which does not present undue health hazards to those using the material. Now, according to the present invention, an inorganic, acicular crystal has been developed which can have a length up to 3 centimeters, or longer, and which has most of the advantageous properties of other known fibrous materials; however, unlike most other inorganic fibers, the acicular crystal of the present invention is attacked by enzymes of biological systems, which not only renders the hydrolysis products relatively harmless to mammals such as humans, but also provides nutrients to the biological system.

SUMMARY OF THE INVENTION

These and other advantages are achieved by an acicular, crystalline calcium metaphosphate.

Broadly, described, the method for preparing the acicular crystalline calcium metaphosphate of the present invention comprises forming a melt of a source of calcium, phosphorus and alkali metal, cooling the melt to about 550° C. to about 970° C., inducing acicular crystal formation, and recovering the acicular crystals.

As is known to those skilled in the art, metaphosphates are ring compounds while polyphosphates are polymeric phosphates. The metaphosphates have a $M_2O$ to $P_2O_5$ ratio, where M is metal, equal to exactly unity while polyphosphates have a $M_2O$ to $P_2O_5$ ratio between about 1 and 2. In some cases, the chemical composition of a long chain polyphosphate and a metaphosphate can be almost identical. Hence, as it is used in the specification and claims, the term "acicular, crystalline calcium metaphosphate" refers to the acicular crystals of $\beta$-calcium meta-phosphate because the X-ray diffraction pattern of the acicular, crystalline calcium metaphosphate of the present invention is almost identical to that reported in the literature for $\beta$-calcium metaphosphate. However, the acicular crystalline calcium metaphosphates of the present invention are not believed to be metaphosphates because the molecules are not believed to be rings, but rather, are believed to be long chain polyphosphates or long chain ultra-phosphates with but a very small amount of cross-linking.

PREPARATION OF THE ACICULAR CRYSTALS

The preparation of acicular crystalline calcium metaphosphate depends on a number of factors, as will occur to those skilled in the art in view of the present disclosure. The ratio of calcium to phosphorus in the melt and the ratio of alkali metals to phosphorus is important. In addition, the concentration and type of impurities in the melt effect the crystal shape of the acicular crystalline calcium metaphosphate. Other important variables are the time and temperature at which the melt is heated, the method of inducing acicular crystal growth during crystallization, and the like.

Any number of materials known to those skilled in the art can be used as a source of calcium, phosphorus and alkali metal to prepare the acicular crystals. Suitable sources of calcium include calcium phosphates, and basic calcium-containing materials such as calcium carbonate, calcium oxide, calcium hydroxide and mixtures thereof, including mixtures commonly known as slaked lime, quick lime, hydrated lime and the like. Suitable sources of phosphorus include phosphorus pentoxide, phosphoric acid and orthophosphate salts, such as sodium dihydrogen phosphate, disodium phosphate, trisodium phosphate, the sodium salts of condensed phosphates which contain at least one P—O—P linkage such as the metaphosphates, the pyrophosphates, the glassy phosphates and the like. The corresponding phosphate salts of lithium, potassium, cesium and rubidium can also be used. Mixtures of salts, acid or oxide can be used in any combination. Suitable sources of alkali metal include alkali metal orthophosphates and condensed phosphates, such as those discussed above, and alkali metal hydroxides and carbonates, such as lithium hydroxide, lithium carbonate, sodium hydroxide, sodium carbonate, potassium hydroxide, potassium carbonate, rubidium hydroxide, rubidium carbonate, cesium hydroxide, cesium carbonate and mixtures thereof. It is preferred to avoid the presence of large amounts of anions other than carbonates, hydroxides and phosphates since the presence of more than trace amounts of such anions as sulfates, halides and the like may affect the growth of acicular crystals.

The mole ratio of alkali metal, calcium and phosphorus is important in the process to prepare acicular crystalline calcium metaphosphate of the present invention. Referring now to the ternary phase diagram of $P_2O_5$, CaO and $M_2O$ where M is an alkali metal such as sodium or potassium, the acicular crystals are formed within the composition ranges set forth below wherein the compositions are in mole percent:

| $M_2O$ | $P_2O_5$ | CaO |
|---|---|---|
| 20 | 48–53 | 27–32 |
| 15 | 48–55 | 30–37 |
| 10 | 48–57 | 33–42 |
| 5 | 48–58 | 37–47 |
| 2 | 50–58 | 40–48 |

Although a few acicular crystals can be obtained when using compositions outside of the above ranges, these compositions provide at least about 25 weight percent acicular crystals in the process of the present invention. It is preferred to use compositions where a greater amount of acicular crystals are obtained, for example, at least 50 weight percent, and at least 90 weight percent of the crystals are acicular crystals when the following preferred compositions are used:

| $M_2O$ | $P_2O_5$ | CaO |
|---|---|---|
| 15 | 50–53 | 35–32 |
| 10 | 50–55 | 40–35 |
| 5 | 50–55 | 45–40 |

The purity of the materials used as a source of phosphates, calcium and alkali metal affects the yield of acicular crystalline calcium metaphosphate according to the process of the present invention. Impure materials frequently fail to yield acicular crystals, and in some cases, if the impurity concentration is sufficiently high, only a glass will be obtained. It is preferred to use reagent grade materials to control the level of impurities.

On the other hand, when certain levels of impurities are present, the crystal growth of the acicular calcium metaphosphate is changed, depending upon the impurity level and the type of impurity. In many cases, the use of certain impurities is desired to provide an acicular, crystalline calcium metaphosphate with desired physical characteristics.

Any number of elements can be added to the mixture of calcium, phosphorus and alkali metal source materials which will alter the physical properties of the resulting acicular calcium metaphosphates. For example, suitable elements to be added to the mixture include aluminum, zinc, molybdenum, cobalt, copper, silver, cesium, silicon, manganese, iron, nickel, vanadium, and the like. Some of these elements tend to retard dendritic growth of the acicular crystals, and aid in producing acicular crystals that are predominantly cylindrical. However, other elements such as boron or titanium either inhibit the formation of acicular crystals or do not provide advantageous properties to the acicular crystals. The use of aluminum, molybdenum, magnesium, iron and mixtures thereof are preferred to aid in providing cylindrical, acicular, calcium metaphosphate, although the use of some elements, such as aluminum, sometimes makes it more difficult to separate the acicular calcium metaphosphate from the soluble alkali metal phosphate by hot water leaching. In addition, certain of these elements, such as aluminum or iron, can extend the time required for the formation of crystals.

The quantity of the additional element, or mixtures thereof, to be added can vary within wide limits. For example, less than about 50 ppm of such elements, or mixtures thereof, generally provide little effect on the characteristics of the acicular crystals. On the other hand, greater than 2000 ppm of such elements will frequently inhibit the formation of the acicular calcium metaphosphate. It is preferred to use between about 250 ppm to about 1000 ppm, based on the total weight of the calcium and alkali metal phosphates. The elements are usually added as the phosphate or hydroxide, and the selection of the additional element, as well as the quantity, to provide the desired characteristics to the acicular crystalline calcium metaphosphate can be determined by routine experimentation by those skilled in the art in view of the present disclosure.

According to the present invention, the materials used as a source of phosphorus, calcium and alkali metal are admixed in proportions to provide the ratios described above and melted. Although satisfactory results are achieved when the materials are substantially dry, sufficient water can be added to form a paste or thick slurry of the materials to aid in mixing. The materials, with or without added water, can be placed in a suitable container, such as a platinum dish or a ceramic crucible, and heated to temperatures up to about 200° C. to evaporate excess moisture. Thereafter, the materials are heated to form a melt, usually at temperatures between about 1000° C. and 1200° C., typically 1050° C. and 1100° C., and maintained at such temperatures for a sufficient length of time to insure that all of the materials are molten, usually about one hour. Excessive times at such temperatures in an open container can change the ratio of calcium, phosphorus and alkali metal since phosphates can evaporate at such temperatures, and hence it is preferred to heat the materials for two hours or less. On the other hand, hot phosphorus pentoxide from an elemental phosphorus burning facility, lime or calcium carbonate, and an alkali metal carbonate can be reacted together in critical mole ratios described above, and the heats of reaction can be sufficient to form a melt in an insulated container.

Then the molten materials are cooled to a temperature below the melting point of β-calcium metaphosphate, about 970° C., and preferably below about 850° C. The temperature should not be allowed to drop too low, since at temperatures below about 550° C. the alkali metal phosphate glass formed in the melt will become so viscous that the growth of acicular crystalline calcium metaphosphate is retarded. It is preferred to maintain the temperature above about 600° C. to reduce the viscosity of the alkali metal phosphate.

When the melt has been cooled to temperatures between about 550° C. and about 970° C., preferably between about 600° C. and about 850° C., the formation of the acicular, crystalline calcium metaphosphate of the present invention can be induced in the alkali metal phosphate glass by techniques known to those skilled in the art. For example, the formation of acicular, crystalline calcium metaphosphate having diameters larger than about 3 microns can readily be induced by seeding the melt with an acicular crystal of calcium metaphosphate from a previous melt, or with an acicular crystal of potassium Kurrol's salt. On the other hand, formation of acicular, crystalline calcium metaphosphate having diameters as small as 0.5 micron or smaller, can be induced by agitation, such as stirring, lightly tapping the container, using ultrasonic techniques, and the like.

Sometimes the growth of acicular, crystalline calcium metaphosphate is not induced by agitation or seeding, even though the phosphorus, calcium and alkali metal are present in the preferred mole ratios. If this occurs, the materials can be reheated to temperatures between about 1000° C. and 1200° C. for a short time, cooled again to temperatures between about 550° C. and about 970° C., and crystallization induced again.

As suggested above, the length and diameter of the acicular crystalline calcium metaphosphate is affected by a number of factors, such as: (1) the composition of the melt; (2) the type and quantity of additives; (3) the method of inducing crystallization, e.g., seeding with a crystal compared to using agitation and the like; (4) the shape of the vessel containing the melt; (5) the depth of the melt in the vessel; (6) temperature of crystallization, and the like. All of these factors are interrelated and optimum conditions for preparing acicular, crystalline calcium metaphosphate with the desired diameter and length for a particular application can be determined by routine experimentation in light of the present disclosure.

After the formation of acicular calcium metaphosphate has been induced, the temperature is maintained between about 550° C. and about 970° C. for a time sufficient to permit crystal growth, which time is usually less than 2 hours and frequently less than 20 minutes. Then, the resulting mass is allowed to cool, and the water insoluble, acicular, crystalline calcium metaphosphate is separated from the remaining ingredients, principally alkali metal phosphate glass, which is water soluble, by dissolving the remaining ingredients in water and recovering the acicular, crystalline calcium metaphosphate by conventional techniques, such as filtration, decantation, centrifugation and the like. The acicular crystals can be broken apart by lightly tapping, or if it is desired to exfoliate the acicular crystals, the insoluble portion can be slurried and separated by decantation.

CHARACTERIZATION OF THE ACICULAR CRYSTALS

Despite the fact that long acicular crystals of calcium metaphosphates can be grown in molten alkali metal phosphates by seeding with an acicular crystal, melts which did not contain an additive element (e.g., aluminum) did not always yield round cylinders, but sometimes blade-like crystals were obtained. Moreover, these blade-like crystals resulted from dendritic growths at an angle to the axis of the mother crystals. However, if from about 50 ppm to about 2000 ppm additive element was added to the system, the growth of these dendrites was usually retarded, and the crystals tended to grow as long slender cylinders substantially free of feathering along the sides. The secondary growths are not desirable because they create weak cleavage planes along the crystal axes. Magnesium, iron and other elements discussed above also aid in retarding the growth of feathered crystals.

Acicular crystals grown by seeding in small platinum dishes do not have uniform diameters and lengths. The length of the crystals depends upon nucleation, bed depth, composition and the like. The lengths vary from a few millimeters to as much as five centimeters, and the diameters of the crystals will vary from 3 about to as much as 100 microns. Diameters of 10 microns or less can be grown repeatedly. Acicular crystals grown by inducing crystallization using agitation have lengths varying from about 5 microns up to about 1 millimeter, and diameters varying from about 0.3 micron or less up to about 2 microns. In all cases the aspect ratio (the length to average diameter ratio) of the acicular crystalline calcium metaphosphate is at least 10:1, usually at least 50:1, and preferably at least 100:1.

Using the infrared analytical techniques developed by Corbridge (DEC Corbridge, "Infrared Analyses of Phosphorus Compounds", *Journal of Applied Chemistry*, 6, 456, 1956), the infrared spectrum of the acicular calcium metaphosphate was found to be identical to that of β-calcium metaphosphate.

X-ray diffraction patterns using CuKα radiation of the acicular crystalline calcium metaphosphate of the present invention were found to be identical to those published on β-calcium metaphosphate (see A. O. McIntosh and W. L. Jablonski, "X-Ray Diffraction Patterns of the Calcium Phosphates", *Analytical Chemistry*, 28, 1424, 1956). The results are presented in Table 1.

The acicular crystals, with a melting point of about 980° C. have good thermal stability and inertness. They are reasonably resistant to corrosion in water, 0.1 normal sodium hydroxide and 0.1 normal hydrochloric acid. They do not form hydrates, i.e., absorb water of crystallization.

TABLE 1

| XRD CHARACTERISTICS | | | |
|---|---|---|---|
| Analytical Chemistry 28 1424 (1956) β-Ca(PO$_3$)$_2$ | | Acicular Crystals | |
| d-spacing | I/I$_O$ | d-spacing | I/I$_O$ |
| 7.05 | 19 | 7.08 | 18 |
| 4.58 | 69 | 4.59 | 28 |
| 4.23 | 65 | 4.26 | 18 |
| 3.87 | 17 | 3.85 | Shoulder |
| 3.74 | 100 | 3.77 | 58 |
| | | 3.74 | 46 |

TABLE 1-continued

| XRD CHARACTERISTICS | | | |
| --- | --- | --- | --- |
| Analytical Chemistry 28 1424 (1956) β-Ca(PO₃)₂ | | Acicular Crystals | |
| d-spacing | I/I$_O$ | d-spacing | I/I$_O$ |
| 3.52 | 100 | 3.53 | 100 |
| 3.38 | 11 | 3.39 | 5 |
| 3.30 | 42 | 3.29 | 9 |
| 3.13 | 65 | 3.14 | 17 |
| 3.01 | 42 | 3.00 | 6 |
| 2.90 | 23 | 2.90 | 6 |
| 2.85 | 65 | 2.85 | 18 |
| 2.54 | 42 | 2.67 | Shoulder |
| | | 2.55 | 68 |
| 2.49 | 11 | — | |
| 2.40 | 11 | 2.40 | 5 |
| 2.32 | 11 | 2.35 | 9 |
| 2.21 | 13 | 2.28 | 5 |
| | | 2.20 | 8 |
| 2.13 | 17 | 2.12 | 5 |
| 2.03 | 17 | 2.05 | 10 |
| 1.97 | 42 | 1.97 | 18 |
| 1.92 | 13 | 1.92 | 17 |

The crystals can vary from needles to asbestiform and have varying degrees of flexibility, depending on the composition of the melt, the presence or absence of additive elements, the conditions of crystallization, and the like, which is exemplified by the "flex test", hereinafter described, which shall have this meaning as set forth in the specification and claims. In the flex test, an acicular crystal is bent around a center peg 1 millimeter in diameter until the crystal breaks. The angle at which the crystal breaks is then measured to give an indication of the stiffness of the crystal. For example, flexible crystals having a diameter between about 3 and about 5 microns and about 3 centimeters long will bend 180° around the 1 millimeter diameter center peg without breaking. On the other hand, acicular crystalline calcium metaphosphate having dendritic growth (feathering) is not as flexible and tends to break at angles less than 90°. The majority of the acicular crystalline calcium metaphosphates having diameters of less than 10 microns can be bent to at least 45° without breaking and most crystals will bend about 90° or more without breaking.

USES OF THE ACICULAR CRYSTALS

Because of their unusual chemical and physical properties, the acicular crystalline calcium metaphosphates of the present invention can find a wide variety of uses. For example, mats or felts of the acicular crystals are readily obtained by suspending the acicular crystals in a liquid, such as water or a glycerine-water mixture, followed by removal of the dispersing liquid. The mats or felts are useful as filters to remove solids from gaseous or liquid streams. Finely ground acicular crystals can be incorporated with oils such as silicone oil to provide thick greases useful as high temperature lubricants. The acicular crystals are good thermal insulators, and are also useful as reinforcing agents for cellulosic fibers and papers.

The acicular crystals of the present invention are also useful as a partial or complete substitute for asbestos in asbestos/cement mixtures to make pipe, sheets and other applications. Up to 70 weight percent acicular crystals, based on the weight of cement present, provides a cement product with superior properties without the health hazard of asbestos fibers.

The acicular crystalline calcium metaphosphate of the present invention is particularly useful to form laminates and composites with organic polymeric materials. Depending upon the intended use and physical properties desired, from about 1 percent to about 99 percent by weight of the composite or laminate can be the acicular crystals. Preferred compositions can readily be determined by routine experimentation by those skilled in the art. Suitable organic polymeric materials which can be used with the acicular crystals to form laminates or composites include: styrene-acrylonitrile-butadiene; acetal copolymers and homopolymers; acrylic ester homopolymers and copolymers; allyl esters, such as diallyl phthalate, diallyl isophthalate, allyl diglycol carbonate and the like; alkyd molding compounds which comprise unsaturated polyester prepolymer, unsaturated monomer, and a source of free radicals; amino plastics prepared by reacting an amino compound, such as melamine or urea, with formaldehyde; cellulosic plastics, such as cellulose nitrate, ethyl cellulose, cellulose acetate, cellulose butyrate, and the like; epoxy resins, such as the reaction product of epichlorohydrin and bisphenol A, and the like; nylons, i.e., long-chain synthetic polymeric amides with recurring amide groups as an integral part of the main polymer chain, such as the nylons prepared by reacting equimolar amounts of hexamethylene diamine and adipic acid, sebacic acid or dodecanoic acid, and the like; phenolic resins such as the phenol-formaldehyde type resins; poly(amideimide) plastics such as those prepared by the condensation of trimellitic anhydride and various aromatic diamines; polyolefins, such as polyethylene, polypropylene, polybutylene and the like; polyesters such as the condensation product of 1,4-butanediol and terephthalic acid or dimethyl terephthalate, the reaction of terephthalates with ethylene glycol, and the like; polyurethanes, polyvinyl and vinyl copolymers such as polyvinyl chloride and the like; polystyrene and polystyrene resins such as styrene-acrylonitrile and the like; thermoplastic elastomers such as styrene-elastomer block copolymers, urethane block copolymers, polyester block copolymers, polyolefin blends, and the like; and alloys prepared by mixing two or more polymers together by mechanical means. Other examples will occur to those skilled in the art in light of the above listing, which is intended to be instructive and not limiting.

DESCRIPTION OF THE PREFERRED EMBODIMENTS

Figure 1:
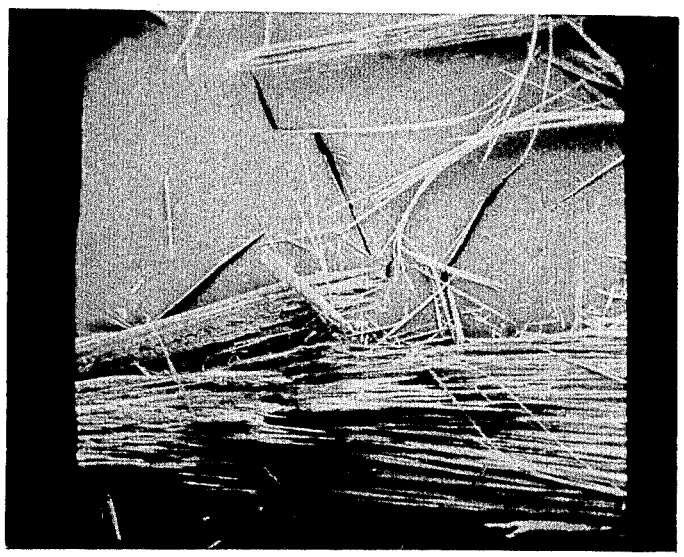
FIG. 1 is a picture taken with the aid of an electron scanning microscope at a magnification of 50 times of a typical acicular crystalline calcium metaphosphate of the present invention prepared according to the general procedure of Example I, hereinafter.

This invention is illustrated by, but not limited to, the following Examples wherein all percentages are given by weight unless otherwise indicated.

EXAMPLE I

To 72.35 grams of calcium carbonate were added 166.25 grams of 85 percent phosphoric acid, 20.67 grams of monosodium dihydrogen phosphate monohydrate, and 8.27 grams of 85 percent phosphoric acid. The above ingredients were thoroughly mixed and placed in a 500 cc. platinum dish and heated to about 200° C. for approximately 2 hours to drive off residual moisture. Then the temperature was increased to 1050° C. for 1 hour. Thereafter, the temperature was decreased to 800° C. and a small crystal of potassium Kurrol's salt was placed in the melt near the edge of the platinum dish. Crystallization was complete after about 15 minutes. The platinum dish was allowed to cool to about 100° C. and the contents were transferred to a 4-liter beaker containing about 2 liters of boiling water. Approximately 50 percent of the fibers separated from the mass after about 4 hours. The fibers were characterized as being smooth, cylindrical crystals having an average diameter of about 20 microns and being about 6.5 centimeters average length.

One of the crystals was separated and subjected to the flex test as described above. The crystal broke at an angle of about 45°.

A sample of the acicular crystals was analyzed by atomic absorption spectrophotometry, which provided the following elemental analysis: 29.8% P; 19.1% Ca; 0.44% Na; 0.01% Fe; and 0.11% Al.

A series of samples of the acicular crystals were analyzed by X-ray diffraction using CuK$\alpha$ radiation. The diffraction patterns confirm that the acicular crystals have the X-ray pattern of $\beta$-calcium metaphosphate. This means that the acicular crystals result as a change of crystal habit rather than internal structural changes. The X-ray patterns and the analyses of several samples are shown in Table 2 along with the values obtained from the ASTM card catalog for X-ray powder patterns for $\beta$-calcium metaphosphate.

TABLE 2

| | X-Ray Powder Patterns Of Calcium Phosphate | | |
|---|---|---|---|
| $\beta$-Ca(PO$_3$)$_2$ ASTM | Sample A | Sample B | Sample C |
| 7.05 | 6.94 | 7.00 | 7.03 |
| 4.58 | 4.52 | 4.56 | 4.56 |
| 4.23 | 4.21 | 4.24 | 4.25 |
| 3.84 | 3.80 | 3.83 | 3.83 |
| 3.74 | 3.74 | 3.76 | 3.76 |
| 3.52 | 3.49 | 3.51 | 3.52 |
| 3.30 | 3.26 | 3.27 | 3.27 |
| 3.13 | 3.09 | 3.11 | 3.11 |
| 3.01 | 2.98 | 2.99 | 3.01 |
| 2.90 | 2.89 | 2.90 | 2.88 |
| 2.85 | 2.84 | 2.83 | 2.83 |
| 2.66 | 2.64 | 2.66 | 2.66 |
| 2.54 | 2.53 | 2.54 | 2.54 |
| 2.13 | 2.12 | 2.12 | 2.12 |

EXAMPLE II

The general procedure of Example I was repeated using the following ingredients:

| | 85% H$_3$PO$_4$ (grams) | NaH$_2$PO$_4$.H$_2$O (grams) | CaCO$_3$ (grams) | Additive | |
|---|---|---|---|---|---|
| | | | | Identity | Grams |
| Run 1 | 191.05 | 20.67 | 72.35 | Al(PO$_4$) | 3.05 |
| Run 2 | 191.05 | 20.67 | 72.35 | (NH$_4$)$_6$Mo$_7$O$_{24}$ | 0.29 |
| Run 3 | 191.05 | 20.67 | 72.35 | FePO$_4$ | 0.42 |

In each of the runs the mixture was heated to 1,000° C. for 1 hour, cooled to 800° C. and seeded with an acicular crystal from Example I.

Figure 2:
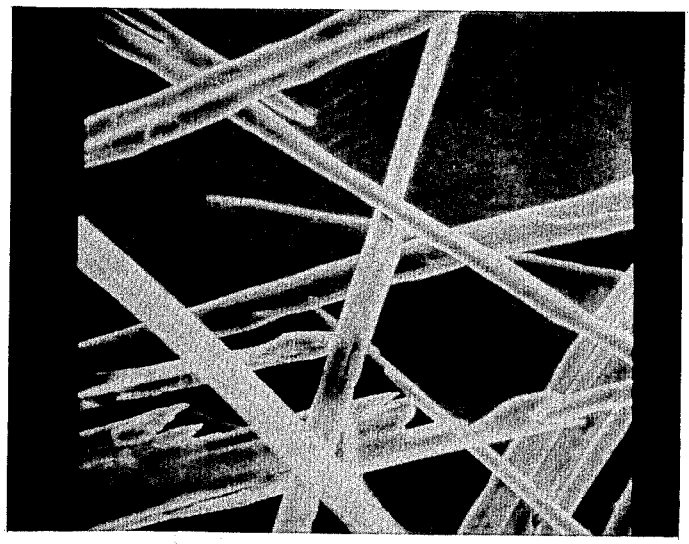
FIG. 2 is a picture taken with the aid of an electron scanning microscope at a magnification of 500 times of a typical acicular calcium metaphosphate of the present invention crystallized in the presence of about 500 ppm molybdenum generally according to the procedure of Example II, hereinafter.
Figure 3:
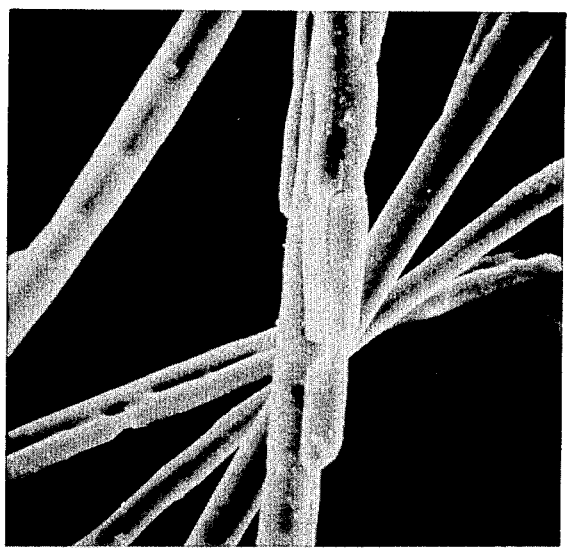
FIG. 3 is a picture taken with the aid of an electron scanning microscope at a magnification of 1,000 times of a typical acicular calcium metaphosphate of the present invention crystallized in the presence of about 500 ppm iron generally according to the procedure of Example II, hereinafter.

After the acicular crystals were recovered and dried, pictures were taken of the acicular crystals with the aid of an electron scanning microscope. Pictures of typical acicular crystals obtained using the general procedure of Runs 2 and 3 containing about 500 ppm molybdenum and iron, respectively, are shown in FIGS. 2 and 3, each taken with the aid of an electron scanning microscope at a magnification of about 500 times, and 1,000 times.

When acicular crystals from each run are subjected to the flex test, crystals from Runs 1 and 3 are bent at least 90°, and crystals from Run 2 are bent 180° without breaking.

EXAMPLE III

The reinforcement properties of the acicular calcium metaphosphate made generally according to the procedure of Run 1 in Example II were determined by encapsulating fiber mats in an epoxy resin matrix. The data were compared to data obtained using glass fibers as reinforcing fibers in the same matrix.

A mat of acicular calcium metaphosphate was prepared using a paper-making machine filter. Test specimens were cut from the mat to a size of about 5 centimeters by about 15 centimeters. The test specimen was placed in a mold and then impregnated with an epoxy resin and curing agent, namely Epon 828 and curing agent 2 available commercially from Shell Oil Company, Houston, Texas. Samples were classified by volume, percent, fiber reinforcement and type of reinforcement. Samples were molded and cured and then cut to 1.25 centimeters by 3.5 centimeters strips from the 0.6 centimeter thick molding. The test specimens were then tested for flexible strength using ASTM test procedures (ASTM Part 35, D790-71, page 308).

It was noted that the acicular crystalline calcium metaphosphate wetted better than glass in the epoxy impregnating step, a desirable property. The results, presented in Table 3, can be summarized using the following formula:

$$S = \frac{3LP}{2bd^2}$$

where:
L = span length (in.)
d = specimen thickness (in.)
b = specimen width (in.)
P = load (#)
S = flexual strength (psi).

TABLE 3

FLEX STRENGTH OF EPOXY MATRICES

| Description | L(") | d(") | b(") | P(#) | S(psi) |
|---|---|---|---|---|---|
| Epoxy Matrix | 2.0 | 0.153 | 0.500 | 41.5 | 10,640 |
| w/o fiber | 2.0 | 0.155 | 0.504 | 45.0 | 11,150 |
|  | 2.0 | 0.156 | 0.508 | 44.5 | 10,800 |
| Average S |  |  | $7.636 \times 10^6$ kg/m$^2$ |  |  |
| Epoxy Matrix | 2.0 | 0.145 | 0.499 | 52.3 | 14,960 |
| w/glass fiber | 2.0 | 0.144 | 0.501 | 51.1 | 14,670 |
| (15 vol. %) | 2.0 | 0.145 | 0.498 | 50.9 | 14,580 |
| Average S |  |  | $10.364 \times 10^6$ kg/m$^2$ |  |  |
| Epoxy Matrix | 2.0 | 0.147 | 0.494 | 57.5 | 16,160 |
| w/phosphate fiber | 2.0 | 0.148 | 0.490 | 55.2 | 15,430 |
| (15 vol. %) | 2.0 | 0.149 | 0.490 | 55.0 | 15,170 |
| Average S |  |  | $10.96 \times 10^6$ kg/m$^2$ |  |  |

EXAMPLE IV

The general procedure of Example II was repeated except that the phosphates of zinc, cobalt, copper, manganese, nickel, vanadium and titanium were used instead of the phosphates of aluminum, molybdenum and iron. Similar results were obtained. In all cases the crystals were bent at least 45° in the flex test and many could be bent 90° or more.

EXAMPLE V

The general procedure of Example I is repeated except that lithium, potassium, rubidium and cesium dihydrogen phosphate each are used instead of sodium dihydrogen phosphate monohydrate at the same mole ratio. Similar results are obtained.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A method for producing acicular, crystalline calcium metaphosphate which comprises:
   (a) forming a melt source of calcium, phosphorus, oxygen and alkali metal wherein the melt contains from about 2 mole percent to about 20 mole percent M$_2$O, where M is alkali metal, from about 48 mole percent to about 58 mole percent P$_2$O$_5$ and from about 27 mole percent to about 48 mole percent CaO;
   (b) cooling the melt to about 550° C. to about 970° C.;
   (c) inducing acicular crystal formation; and
   (d) recovering the acicular crystals.

2. A method of claim 1 wherein the melt contains from about 5 mole percent to about 15 mole percent M$_2$O, where M is alkali metal, and from about 50 to about 55 mole percent P$_2$O$_5$.

3. A method of claim 2 wherein the melt contains from about 50 ppm to about 2000 ppm of an element selected from the group consisting of zinc, cobalt, copper, manganese, nickel, vanadium and mixtures thereof.

4. A method of claim 2 wherein the melt contains from about 50 ppm to about 2000 ppm of an element selected from the group consisting of aluminum, molybdenum, iron and mixtures thereof.

5. A method of claim 3 or 4 wherein the melt contains from about 250 ppm to about 1000 ppm of the element.

6. A method of claim 1 wherein the acicular crystal formation is induced by seeding.

7. A method of claim 6 wherein the acicular crystal formation is induced by seeding with a crystal of potassium Kurrol's salt or acicular calcium metaphosphate.

8. A method of claim 1 wherein the source of calcium is selected from the group consisting of calcium carbonate and calcium hydroxide.

9. A method of claim 1 wherein the source of phosphorus is an alkali metal phosphate, phosphoric acid or mixtures thereof.

10. A method of claim 1 wherein the alkali metal is sodium or potassium.

11. A method of claim 1 wherein the melt is cooled to about 600° C. to about 850° C.

12. Acicular, crystalline calcium metaphosphate made by the process of any one of claims 1 through 7 and 2 through 4.

13. Acicular, crystalline calcium metaphosphate having an aspect ratio of at least 10:1.

14. The calcium metaphosphate of claim 12 having an aspect ratio of at least 50:1.

15. The calcium metaphosphate of claim 12 having an aspect ratio of at least 100:1.

16. The calcium metaphosphate of claim 12, 14 or 15 wherein the average diameter is between about 0.3 micron and about 100 microns.

17. The calcium metaphosphate of claim 12, 14 or 15 wherein the average diameter is between about 3 microns and about 50 microns.

18. The calcium metaphosphate of claim 12 which will bend at least 30° as determined by the flex test.

19. The calcium metaphosphate of claim 18 which will bend at least 45°.

20. The calcium metaphosphate of claim 18 which will bend at least 90°.

21. The calcium metaphosphate of claim 18 which will bend at least 180°.

22. Crystalline calcium metaphosphate wherein at least 25 weight percent of the crystals are acicular and having an aspect ratio of at least 10:1.

23. The crystalline calcium metaphosphate of claim 22 wherein at least 50 weight percent of the crystals are acicular and having an aspect ratio of at least 10:1.

24. The crystalline calcium metaphosphate of claim 22 wherein at least 90 weight percent of the crystals are acicular and having an aspect ratio of at least 10:1.

25. The crystalline calcium metaphosphate of claim 22, 23 or 24 wherein the acicular crystals have an average diameter between about 1 micron and about 50 microns and an aspect ratio of at least 100:1.

26. A composite which comprises from about 1 to about 99 percent by weight acicular crystalline calcium metaphosphate having an aspect ratio of at least 10:1, and from 1 to about 99 percent by weight organic polymeric material.

* * * * *

UNITED STATES PATENT AND TRADEMARK OFFICE
CERTIFICATE OF CORRECTION

PATENT NO. : 4,360,625
DATED : November 23, 1982
INVENTOR(S) : Edward J. Griffith It is certified that error appears in the above-identified patent and that said Letters Patent are hereby corrected as shown below:

Column 1, line 31, "rear" should read --- rare ---;

Column 3, lines 61-62, "phos-phates" should read --- phos-phorus ---;

Column 11, line 49 through column 12, line 65, Claims "1 through 26" should read ---

1. Acicular, crystalline calcium metaphosphate having an aspect ratio of at least 10:1.

2. The calcium metaphosphate of Claim 1 having an aspect ratio of at least 50:1.

3. The calcium metaphosphate of Claim 1 having an aspect ratio of at least 100:1.

4. The calcium metaphosphate of Claim 1, 2 or 3 wherein the average diameter is between about 0.3 micron and about 100 microns.

UNITED STATES PATENT AND TRADEMARK OFFICE
CERTIFICATE OF CORRECTION

PATENT NO. : 4,360,625

DATED : November 23, 1982

INVENTOR(S) : Edward J. Griffith

It is certified that error appears in the above-identified patent and that said Letters Patent is hereby corrected as shown below:

5. The calcium metaphosphate of Claim 1, 2 or 3 wherein the average diameter is between about 3 microns and about 50 microns.

6. The calcium metaphosphate of Claim 1 which will bend at least 30° as determined by the flex test.

7. The calcium metaphosphate of Claim 6 which will bend at least 45°.

8. The calcium metaphosphate of Claim 6 which will bend at least 90°.

9. The calcium metaphosphate of Claim 6 which will bend at least 180°.

10. Crystalline calcium metaphosphate wherein at least 25 weight percent of the crystals are acicular and having an aspect ratio of at least 10:1.

11. The crystalline calcium metaphosphate of Claim 10 wherein at least 50 weigh percent of the crystals are acicular and having an aspect ratio of at least 10:1.

12. The crystalline calcium metaphosphate of Claim 10 wherein at least 90 weight percent of the crystals are acicular and having an aspect ratio of at least 10:1.

UNITED STATES PATENT AND TRADEMARK OFFICE
CERTIFICATE OF CORRECTION

PATENT NO. : 4,360,625

DATED : November 23, 1982

INVENTOR(S) : Edward J. Griffith

It is certified that error appears in the above-identified patent and that said Letters Patent is hereby corrected as shown below:

13. The crystalline calcium metaphosphate of Claim 10, 11 or 12 wherein the acicular crystals have an average diameter between about 1 micron and about 50 microns and an aspect ratio of at least 100:1.

14. A method for producing acicular, crystalline calcium metaphosphate which comprises:
(a) forming a melt of a source of calcium, phosphorus, oxygen and alkali metal wherein the melt contains from about 2 mole percent to about 20 mole percent $M_2O$ where M is alkali metal, from about 48 mole percent to about 58 mole percent $P_2O_5$ and from about 27 mole percent to about 48 mole percent CaO;

(b) cooling the melt to about 550°C. to about 970°C.;

(c) inducing acicular crystal formation; and (d) recovering the acicular crystals.

15. A method of Claim 14 wherein the source of calcium is selected from the group consisting of calcium carbonate and calcium hydroxide.

16. A method Claim 14 wherein the source of phosphorus is an alkali metal phosphate, phosphoric acid or mixtures thereof.

UNITED STATES PATENT AND TRADEMARK OFFICE
CERTIFICATE OF CORRECTION

PATENT NO. : 4,360,625

DATED : November 23, 1982

INVENTOR(S) : Edward J. Griffith

It is certified that error appears in the above-identified patent and that said Letters Patent is hereby corrected as shown below:

17. A method of Claim 14 wherein the alkali metal is sodium or potassium.

18. A method of Claim 14 wherein the melt is cooled to about 600°C. to about 850°C.

19. A method of Claim 14 wherein the acicular crystal formation is induced by seeding.

20. A method of Claim 19 wherein the acicular crystal formation is induced by seeding with a crystal of potassium Kurrol's salt or acicular calcium metaphosphate.

21. A method of Claim 14 wherein the melt contains from about 5 mole percent to about 15 mole percent $M_2O$, where M is alkali metal, and from about 50 to about 55 mole percent $P_2O_5$.

22. A method of Claim 21 wherein the melt contains from about 60 ppm to about 2000 ppm of an element selected from the group consisting of zinc, cobalt, copper, manganese, nickel, vanadium and mixtures thereof.

23. A method of Claim 21 wherein the melt contains from about 60 ppm to about 2000 ppm of an element selected from the group consisting of aluminum, molybdenum, iron and mixtures thereof.

UNITED STATES PATENT AND TRADEMARK OFFICE
CERTIFICATE OF CORRECTION

PATENT NO. : 4,360,625

DATED : November 23, 1982

INVENTOR(S) : Edward J. Griffith

It is certified that error appears in the above-identified patent and that said Letters Patent is hereby corrected as shown below:

24. A method of Claim 22 or 23 wherein the melt contains from about 250 ppm to about 1000 ppm of the element.

25. Acicular, crystalline calcium metaphosphate made by the process of any one of Claims 14 through 24.

26. A composite which comprises from about 1 to about 99 percent by weight acicular crystalline calcium metaphosphate, having an aspect ratio of at least 10:1, and from 1 to about 99 percent by weight organic polymeric material.

Signed and Sealed this

Nineteenth Day of March 1985

[SEAL]

*Attest:*

DONALD J. QUIGG

*Attesting Officer*       *Acting Commissioner of Patents and Trademarks*